United States Patent [19]

Rasicci et al.

[11] 4,022,734

[45] May 10, 1977

[54] POLYMER LATICES CONTAINING A WATER SOLUBLE SALT OF POLYBASIC FATTY ACID AND 2-ALKYL IMIDAZOLINE DERIVATIVE FOR USE IN FIBER DISPERSIONS

[75] Inventors: Vincent Martion Rasicci, Avon Lake; Raymond Nicholas Swanson; Paul Arthur Clotz, both of Lorain, all of Ohio

[73] Assignee: The B. F. Goodrich Company, Akron, Ohio

[22] Filed: May 29, 1975

[21] Appl. No.: 581,821

[52] U.S. Cl. ............... 260/29.6 MN; 260/29.7 N
[51] Int. Cl.² .......................... C08L 33/08
[58] Field of Search ............ 260/29.6 MN, 29.7 N, 260/23 AR, 23 EM, 23.7 A, 23.7 N

[56] References Cited

UNITED STATES PATENTS

| | | | |
|---|---|---|---|
| 2,769,713 | 11/1956 | Wilson | 260/23.7 A |
| 3,093,609 | 6/1963 | Feigley et al. | 260/19 N |
| 3,491,033 | 1/1970 | Dunn | 260/852 |

FOREIGN PATENTS OR APPLICATIONS 1,123,203   8/1968   United Kingdom

*Primary Examiner*—M. J. Welsh
*Attorney, Agent, or Firm*—J. Hughes Powell, Jr.

[57] ABSTRACT

In fiber beater addition processes, polymer latexes containing a water-soluble salt of polybasic fatty acid and a 2-alkyl imidazoline derivative have storage stability and provide a broad range of freeness response from the same latex for use in the fiber slurry beater addition of latices to form fiber sheet materials in which polymers in latex form are incorporated into water dispersions of fibers and deposited thereon by coagulation. These latexes are obtained by either polymerizing the monomers to form polymer in aqueous dispersion in the presence of the polybasic fatty acid and 2-alkyl imidazoline derivative, by the presence of at least one of them during such polymerization and the addition of the other to the latex before adding to a water dispersion of the fiber, or addition of the polybasic fatty acid salt and 2-alkyl imidazoline derivative to an already prepared latex.

10 Claims, No Drawings

POLYMER LATICES CONTAINING A WATER SOLUBLE SALT OF POLYBASIC FATTY ACID AND 2-ALKYL IMIDAZOLINE DERIVATIVE FOR USE IN FIBER DISPERSIONS

BACKGROUND OF THE INVENTION

U.S. Pat. No. 3,093,609 describes an aqueous dispersion of an organic binder in particulate form in a latex, which dispersion contains an emulsifying agent selected from the group consisting of sulfonated anionic agents and nonionic agents, in conjunction with a water soluble salt of an aliphatic polycarboxylic acid containing at least 36 carbon atoms. This system requires the absence of standard emulsifiers. This system provides aqueous dispersions (not latices) of particular organic binders for deposition onto papermaking fibers and the system is deficient as to freeness control.

SUMMARY OF THE INVENTION

In accordance with this invention there is provided an improved process wherein in fiber beater addition processes, particularly asbestos beater addition, a high Canadian standard freeness and a broad freeness response from a single storage stable latex is obtained so that fiber matrices of varying density are readily prepared from a single latex by use of a polymer latex containing both an alkali metal water-soluble salt of a polybasic fatty acid of dimer and trimer derivatives of oleic, linoleic, and conjugated linoleic acids to provide materials containing 36 to 54 carbon atoms and a water soluble alkali metal salt of derivatives of 2-alkyl imidazolines having the general structure

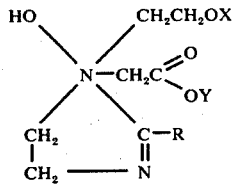

wherein Y is H or an alkali metal and X is

DETAILED DESCRIPTION

In the practice of the invention the improvement is readily obtained by first preparing a fiber water blend of asbestos, cellulose polymer and like fiber in a beater or refiner to break down the fiber bundles, diluting the furnish to the required consistency, adding the latex binder and forming the sheet.

The fibers are prepared in accordance with the usual beater saturation technique and the fibers will be taken up in water so as to form a slurry having about 0.5 to 3% consistency, more preferably about 1.5 to 2.5%. In the case of asbestos the fibers are placed in a beater to break up the fiber bundles to their consistency as well as to decrease the size and this may also be done with a refiner. Fibers treated in accordance with the invention include, for example, asbestos fibers and cellulosic fibers, including wood fiber, rag fiber, polyacrylonitrile fibers, viscose fibers, nylon, cotton, Kraft and sulfite and the like normally used to make paper or felted products. As has been stated, in the case of asbestos fibers, normally no additional precipitation or coagulation agent is required to be added after the latex binder has been added to the furnish. The invention is of particular utility in controlling the Canadian freeness of treated asbestos dispersions. However, it may be necessary to add alum to other fiber slurries for coagulation.

The incorporation of synthetic polymer latices into fibrous slurries or dispersions before formation of a sheet therefrom is by wet-end or beater addition. This technique is used to incorporate in the fiber sheet from less than 1% to more than 50% polymer content, depending on the end use of the sheet. Controlled deposition of the latex particles is obtained by the addition of a coagulant such as papermaker's alum in water solution to fiber other than asbestos. The novel latices of this invention can be applied to a variety of techniques including direct addition, the inverted method, the Armstrong method, continuous addition, and the like.

In direct addition, after the furnish has been beaten to the desired degree of freeness, the pH of the pulp furnish is adjusted to between 8.5 and 9.0 with alkali. The latex is added to the pulp furnish and is dispersed by operating the beater. The latex may be diluted before addition. After the latex has been dispersed, a 1 to 10% solution of a coagulant, for example, alum, is added to coagulate the latex polymer which is deposited on the fibers. In the inverted method the furnish is beaten to the desired freeness, the pH is reduced to 4.5 using alum and dilute latex is added thereto. The Armstrong method is described in U.S. Pat. Nos. 2,375,245 and 2,613,190. In the continuous method the furnish is prepared, the pH reduced to 4.5 with alum and the latex is added after the furnish leaves the beater. It is understood by those skilled in the art that in commercial methods of latex wet-end addition, the latex is normally added as dilute as possible at a point of maximum agitation, in the range of about 10 to 60% total solids. In each case the anionic polymer is added prior to the latex addition.

This invention may be applied to any synthetic polymer latex of vinylidene monomers containing at least one terminal $CH_2<$ grouping used in wet-end addition to fibrous slurries, and improvement will be obtained thereby both in the process and resulting sheet product, particularly in more complete deposition and clear serum. These monomers and polymer thereof include vinyl chloride, styrene, vinyl acetate, vinylidene chloride, acrylic esters, conjugated dienes and like polymer latices, as is well known in the art, particularly latices of elastomeric polymers. Such latices include, for example, latices of alkyl acrylate polymers and copolymers, polychloroprene, copolymers of butadiene and acrylonitrile, butadiene and methyl methacrylate, butadiene and vinylidene chloride, butadiene and styrene, vinyl chloride polymer latices including copolymers of vinyl chloride and 5 to 40 parts of copolymerized alkyl acrylates and the like. Typical useful latices are described in "Synthetic Rubber", Whitby, 1954 and "Polymer Processes", Schildknecht, 1956.

This invention is particularly adapted to use of latices containing polymers of butadiene or alkyl acrylates and copolymers thereof. Alkyl acrylate polymers are valuable in providing improved fibrous articles containing the alkyl acrylate polymers dispersed thereon. Since some alkyl acrylates have some water solubility, polymerization thereof to form latices may be conducted in the presence of minimum amounts of surface active agents. In some systems more difficulty has been experienced in adequately depositing low surface active-containing or nonionic emulsifier-containing latices on fibrous materials in aqueous suspension than with latices containing larger amounts of ionic surface active agents. Such polymers include homo- and copolymers of alkyl acrylates wherein the alkyl groups of esters of acrylic acid contain from 1 to 8 carbon atoms. Improved polymer latices are prepared from copolymers of alkyl acrylates and butadiene with vinylidene monomers containing at least one terminal $CH_2<$ groups; including particularly, monomers such as styrene, $\alpha$-methyl styrene, acrylonitrile, methacrylonitrile, ethyl methacrylate, butyl methacrylate, methyl ethacrylate, acrylic acid, itaconic acid, vinyl chloride, vinylidene chloride, vinyl acetate and the like. Such polymers may also include cure sites generally supplied by chlorine-containing monomers as vinyl chloroacetate, chloropropyl acrylate, chloroethyl vinyl ether, vinyl benzyl chloride and other known comonomers.

Excellent results are obtained with latices of butadiene or alkyl acrylates containing as much as 20% of reactive monomers, for example, acrylamide and methacrylamide, t-butyl acrylamide, octyl acrylamide and diacetone acrylamide, N-alkylol amides as N-methylol acrylamide and N-methylol methacrylamide, N-alkoxyalkyl acrylamides including for example, N-ethoxy methacrylamide and N-butoxy methacrylamide and $\alpha,\beta$-unsaturated carboxylic acids containing 3 to 8 carbon atoms including, for example, acrylic acid and methacrylic acid, dicarboxylic acids as itaconic acid, and the like. Normally, at least about 0.2% of these comonomers are used. Useful are copolymers of ethyl, methyl and butyl acrylate containing about one part each of at least two such comonomers for example, N-butoxymethyl acrylamide and acrylamide, N-methylol acrylamide and acrylamide, N-methylol acrylamide and methacrylamide, N-methylol acrylamide and acrylic acid and the like. The total of such monomers normally being less than about 10% of the copolymer.

One of the necessary ingredients present in the binder dispersion is a water-soluble salt of an aliphatic polycarboxylic acid containing at least 36 carbon atoms. These acids are best illustrated by the ammonium and alkali metal dimerized and trimerized fatty acids which are readily available in commerce. These acids are prepared by the thermopolymerization of drying oil acids carried out in a pressure vessel in the presence of water in the form of steam. The resulting compositions contain dimer and trimer and may contain monomer. Such products are known as dimerized fatty acids and will generally have an iodine value of approximately 90, and an acid number of approximately 190. The dimerized acid itself is essentially a 36-carbon dicarboxylic acid obtained by dimerization of the linoleic acid of soya, cotton seed, corn, and linseed oils of commerce. The product is frequently referred to as dilinoleic acid. The dimerized acids and the trimerized acids resulting from the above-described pressurized process may be separated or further concentrated as desired. As a further variation on the dimer and trimer acids, any residual unsaturation in the carbon chain may be eliminated by hydrogenation. These are the polymerized long chain fatty acids containing a plurality of polycarboxylic acid groups and containing at least 36 carbon atoms which are to be added in the form of their alkali metal salts to the binder dispersion.

These polycarboxylic acids have the basic structure

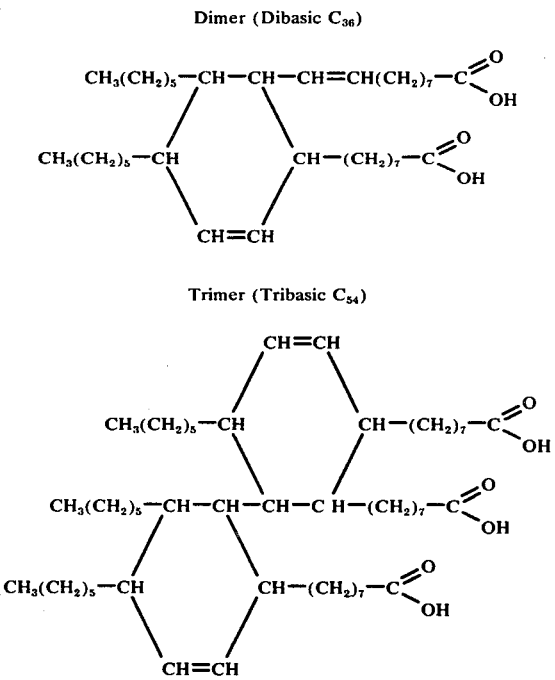

In the commercially available dimer-trimer fatty acids, the ratio of $C_{36}$ dibasic dimer acid, $C_{54}$ tribasic trimer acid and $C_{18}$ monobasic fatty acid varies from about 10% of the dimer acid to about 97% and from about 3 to about 90% of the trimer acid and from about 0 to about 10% of the monobasic acid. The proportions of typical commercial materials given as percent of monobasic acid, dimer acid and trimer acid are, for example, 0-97-3, 10-87-3, 1-95-4, 0-87-13, 0-83-17, 0-75-25, 0-20-80, 0-10-90, 0-40-60.

The preferred polycarboxylic acids are those containing the dimer and trimer acid, that is, the dibasic $C_{36}$ and $C_{54}$ materials. While improved results are obtained when the polybasic acid contains as little as about 20% $C_{36}$ acid, it is preferred that the polybasic acid contain more than 50% $C_{36}$-$C_{54}$ dimer and/or trimer acid, and more preferably greater than about 80 weight percent. In order to obtain a greater latitude in control of the Canadian standard freeness in polymer latices in beater addition, excellent results are obtained when the polybasic acids containing varying amounts of dimer and trimer acid, used in conjunction with the defined alkali metal salts of 2-imidazoline derivatives defined in this invention; with at least about 1 weight part each of these two components are used. As the trimer/dimer ratio is increased in a particular system, usually the Canadian freeness will range higher. Better results are generally obtained with larger amounts when used as the sole stabilizing agents or when added to polymer latices containing other emulsifying systems which are not precipitated when the water soluble polybasic salt and water soluble salt of the 2-imidazoline derivative are added to such polymer latices. These materials may be used in any alkaline, free radical emulsion polymerization and added to any polymer latex whose emulsifier system is stable to the addition of these materials.

The water-soluble 2-alkyl imidazoline derivatives have the general structure

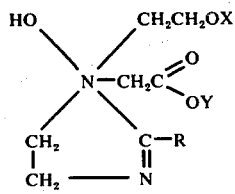

wherein X is an alkali metal or a

wherein Y is an alkali metal and wherein R is an alkyl group derived from a fatty acid containing from about 6 to about 20 carbon atoms. Specific imidazolines are the monocarboxylates or dicarboxylates having the structure

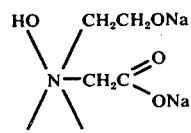 (I)

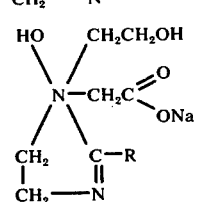 (II)

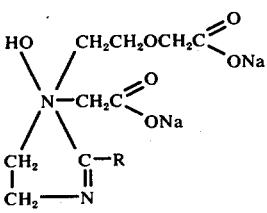 (III)

where in the monocarboxylate (I) R is an alkyl chain containing $C_7$ to $C_{17}$, as lauryl $C_{11}H_{23}$, in (II) R is an alkyl chain as oleic $C_{17}H_{33}$, stearic $C_{17}H_{35}$ and capric $C_9H_{19}$, that is, from $C_7$ to $C_{17}$, and in (III) wherein R is alkyl as caprylic $C_7H_{15}$, coconut $C_{12}H_{25}$ ($C_8$–$C_{18}$), capric $C_9H_{19}$, and the like. R may contain normally from about 6 to about 20 carbon atoms, more preferably about 10 to 18 carbon atoms. The ammonium and alkali metal salts are normally employed.

The amounts of these acids and salts will be varied in amount so that the total of both is at least about 1 and more than 0.1 weight part of each per 100 weight parts of monomer or polymer in a given latex, more normally the amounts will be greater than about 0.5 to about 6 weight parts of each.

In accordance with this invention the Canadian freeness related to the gauge or density of the desired sheet is readily controlled in accordance with this invention by the use of polyacrylic acid so that the gauge sheet desired is formed. In any event, it will be understood that once the polymer is deposited on the fiber particles, a sheet of the coated fiber is then readily formed on conventional papermaking equipment such as a cylinder machine or Fourdrinier wire. As has been noted, the invention is of particular utility with asbestos furnish where problems have been previously observed in treating such materials with polymer latices because of the presence in the furnish of substantial amounts of metal ions.

The Canadian standard freeness value is a measure of the ease with which water passes through fibers while they are being formed into a wet mat on a perforated plate. The Canadian Standard Freeness Tester consists of an upper container of 1 liter capacity which holds the fiber-water slurry, a perforated plate at the bottom, a bottom cover, a hinged top and a petcock for air admission. When the bottom cover is dropped and the petcock is opened, the water draining from the fibers in the upper container drops into a funnel type receptacle with an overflow outlet in the side and flows through a standard orifice in the bottom. If the water drains into the funnel from the fibers at a rate greater than can be handled by the standard outlet, the excess flows through the overflow tube and is collected in a graduated cylinder. The volume of this overflow measured in milliliters is known as the Canadian standard freeness value.

EXAMPLE I

Several latices are prepared according to the following recipe with the amounts of reactants set forth in the table. All parts are weight parts per 100 weight parts of monomer.

| Ingredients | Run 1 | 2 | 3 | 4 |
|---|---|---|---|---|
| Soft water | 133 | 133 | 133 | 133 |
| HCHO-Naphthalene sulfonic acid | 1.0 | 1.0 | 1.0 | 1.0 |
| Tebrasodium EDTA* | 0.2 | 0.2 | 0.2 | 0.2 |
| EDTA NaFe | 0.004 | 0.004 | 0.004 | 0.004 |
| Trisodium phosphate | 0.5 | 0.5 | 0.5 | 0.5 |
| KOH | 0.8 | 0.8 | 0.8 | 0.8 |
| Potassium polybasic acid | | | | |
| No. 1 | 4.0 | — | — | — |
| No. 2 | — | 4.0 | — | — |
| No. 3 | — | — | 4.0 | — |
| No. 4 | — | — | — | 4.0 |
| T-$C_{12}$ mercaptan | 0.3 | 0.3 | 0.3 | 0.3 |
| Acrylonitrile | 32.8 | 32.8 | 32.8 | 32.8 |
| Butadiene | 67.2 | 67.2 | 67.2 | 67.2 |
| Cumene hydroperoxide | 0.6 | 0.6 | 0.6 | 0.6 |
| Sodium formaldehyde sulfoxylate | 0.046 | 0.046 | 0.046 | 0.046 |

1  3% $C_{54}$ trimer acid, 97% $C_{36}$ dimer acid
2  17% $C_{54}$ trimer acid, 83% $C_{36}$ dimer acid
3  25% $C_{54}$ trimer acid, 75% $C_{36}$ dimer acid
4  60% $C_{54}$ trimer acid, 40% $C_{36}$ dimer acid
*EDTA is ethylenediamine tetraacetic acid The reaction was conducted at 8° C. for 24 hours to obtain substantially complete conversion. There was added to one portion of the latex 1 weight part of a monocarboxylate 2-imidazoline derivative wherein R is derived from coconut oil containing 8 to 18 carbon atoms with an average of $C_{12-14}$. The Canadian freeness of these latices was determined after the addition of 5% sodium citrate solution in the amounts indicated in the table to the asbestos slurry and then the latex was added in amounts to add 20% on the asbestos.

| Latices | No Additives | 2-imidazoline derivative |
|---|---|---|
| cc sodium citrate | 10 | 10 |
| Canadian standard freeness - cc | 715 | 610 |
| cc sodium citrate | 20 | 20 |
| Canadian standard freeness - cc | 595 | 515 |
| cc sodium citrate | 30 | 30 |
| Canadian standard freeness - cc | 430 | 380 |
| cc sodium citrate | 40 | 40 |
| Canadian standard freeness - cc | 350 | 315 |

EXAMPLE II

Another butadiene-acrylonitrile latex containing 67.2% butadiene-1,3, 32.8% acrylonitrile polymerized with 4.0 weight parts of potassium polybasic acid containing 75% dimer acid and 25% trimer acid was treated by adding thereto 1.5 weight parts of a sodium salt of a dicarboxylic imidazoline of caprylic acid wherein R is $C_7H_{15}$. The Canadian standard freeness values obtained on the addition of 0, 10, 20 and 30 cc. of 5% sodium citrate are as follows: The control at 0 was 780, at 10 was 710 and at 30 was about 375. With the imidazoline additive, a straight line curve was obtained in contrast to the control not containing the imidazoline derivative, and the Canadian standard freeness values were, at 0 was 775 cc., at 10 cc. was 650 cc., at 20 cc. was 535 cc. and with 30 cc. was 410 cc.

EXAMPLE III

Another series of polymer latices were prepared in accordance with Example I wherein both the polybasic acid salt and 2-imidazoline derivative were present in the polymerization initially. The polymerization recipes of Example I were used and the amounts and types of the polybasic acids and 2-imidazoline derivatives are set forth in the table below.

| Stabilizers | Run 1 | Run 2 | Run 3 | Run 4 |
|---|---|---|---|---|
| Emery 33480 | 3.0 | — | — | — |
| 10% dimer acid 90% trimer acid | — | 3.0 | — | — |
| 75% dimer acid 25% trimer acid | — | — | 3.0 | — |
| 75% dimer acid 25% trimer acid | — | — | — | 3.0 |
| 2-imidazoline coconut oil derivative, R $C_{12-14}$ average | 1.0 | 1.0 | 1.0 | 1.0 |

These latices were then tested for Canadian standard freeness when the indicated amounts of sodium citrate solution was added thereto with the results shown in the data table below.

| | Run 1 | Run 2 | Run 3 | Run 4 |
|---|---|---|---|---|
| cc Sodium citrate | 0 | 0 | 0 | 0 |
| CSF | 765 | 790 | 760 | 760 |
| cc Sodium citrate | 10 | 10 | 10 | 10 |
| CSF | 650 | 700 | 655 | 650 |
| cc Sodium citrate | 20 | 20 | 20 | 20 |
| CSF | 500 | 580 | 480 | 500 |
| cc Sodium citrate | 30 | 30 | 30 | 30 |
| CSF | 360 | 420 | 370 | 370 |

EXAMPLE IV

This example demonstrates the control of the Canadian standard freeness of a polymer latex of an alkyl acrylate wherein the polymer contains about 75% ethyl acrylate, 21% methyl methacrylate and 4% acrylonitrile. Run No. 1 contained potassium salt, a polybasic material containing 40% dimer, 60% trimer added in amounts of 2.5 weight parts. Run No. 2 contained the same polycarboxylic salt in the same amount and in addition one weight part of the sodium salt of the coco 2-imidazoline derivative and Run No. 3 contains 2.5 weight parts of the potassium polybasic acid containing 75% dimer, 25% trimer and one weight part of the 2-imidazoline derivative. This demonstrates both the improvement obtained when both the polybasic acid and 2-imidazoline derivative are present and that unexpectedly improved control of Canadian standard freeness is obtained with polybasic acids containing the higher dimer acid content. The data obtained when adding the listed cc. of 5% sodium citrate solution and the resulting Canadian standard freeness are set forth in the data table below.

| | Run 1 | Run 2 | Run 3 |
|---|---|---|---|
| cc sodium citrate | 0 | 0 | 0 |
| Canadian standard freeness | 830 | 810 | 785 |
| cc sodium citrate | 10 | 10 | 10 |
| Canadian standard freeness | 830 | 790 | 740 |
| cc sodium citrate | 20 | 20 | 20 |
| Canadian standard freeness | 800 | 750 | 700 |
| cc sodium citrate | 30 | 30 | 30 |
| Canadian standard freeness | 730 | 695 | 645 |

As a further demonstration of the Canadian standard freeness obtained with varying amounts of these additives, two samples of this latex were made up, one containing (1) 0.5 weight part of the 2-imidazoline derivatives and 1.8 weight part of the polybasic salt and (2) 1 weight part of the 2-imidazoline derivative and 2.5 weight parts of the potassium polybasic acid. The polybasic acid contained 75% dimer and 25% trimer. With 0 cc. of sodium citrate the CSF of No. 1 was 820 and No. 2 was 795; at 20 cc., No. 1 was about 795 and No. 2 was 700; at 30 cc., No. 1 was at 700 and No. 2 at 650; at 40 cc., No. 1 was about 530 and No. 2 was 400.

Fiber sheet formed in accordance with this invention has good drainage rates, good appearance and there is no stocking to screen or felt. The dry sheets have good tensile strengths.

We claim:

1. In the process for preparing fiber sheets having polymer latex particles deposited on the fibers wherein said polymer contains polymerized vinylidene monomers containing at least one terminal $CH_2<$ grouping and the polymeric latices are added to fiber slurries or dispersions before formation of a sheet therefrom by coagulation, the improvement which comprises adding to said dispersion a storage stable polymer latex having a broad range of Canadian standard freeness responses comprising an aqueous dispersion of said polymer and stabilizing amounts of water-soluble salts of polybasic fatty acids containing 36 to 54 carbon atoms and a water-soluble 2-alkyl imidazoline derivative having the structure

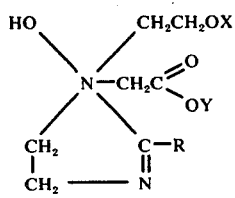

wherein X is an alkali metal or a

Y is an alkali metal and R is an alkyl group derived from a fatty acid containing from about 6 to about 20 carbon atoms.

2. A process of claim 1 wherein the polybasic fatty acids are dimer and trimer having the basic structures

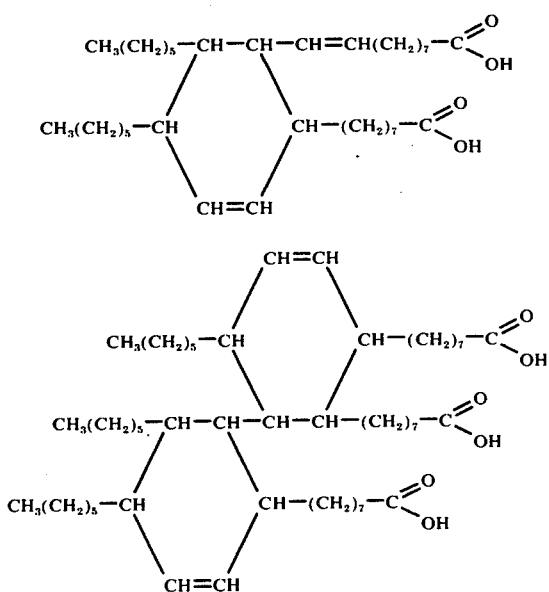

and in the imidazoline derivative R contains about 7 to 18 carbon atoms and each of the polybasic acid and imidazoline derivative is present in amount of more than 0.1 weight percent based on the polymer and there is a total of at least about 1 weight percent total of the polybasic fatty acids and imidazoline derivative in said latex in the form of alkali metal salts.

3. A process of claim 2 wherein the polybasic acid contains from about 5 to 90 weight percent $C_{54}$ trimer acid and about 10 to about 95 weight percent dimer acid and R of the imidazoline derivative averages about $C_7$ to $C_{11}$.

4. A process of claim 3 wherein said fiber slurry is an asbestos fiber slurry.

5. A process of claim 4 wherein said polymer is a polymer of an alkyl acrylate ester.

6. A process of claim 4 wherein said polymer is a butadiene-1,3 polymer.

7. A process of claim 5 wherein the latex contains a polymer of an alkyl acrylate ester and there is present at least 0.5 weight part each of said polybasic fatty acid and imidazoline derivative.

8. A process of claim 6 wherein the latex contains a polymer of butadiene-1,3 and there is present at least 0.5 weight part each of said polybasic acid and imidazoline derivative.

9. A process of claim 7 wherein the polymer is an ethyl acrylate polymer.

10. A process of claim 8 wherein the polymer is a copolymer of butadiene-1,3 and acrylonitrile.

* * * * *